(12) United States Patent
Briquet et al.

(10) Patent No.: US 12,095,087 B2
(45) Date of Patent: Sep. 17, 2024

(54) LITHIUM METAL PHOSPHATE, ITS PREPARATION AND USE

(71) Applicant: JOHNSON MATTHEY PLC, London (GB)

(72) Inventors: Ludovic Briquet, Reading (GB); Maria Rivas-Velazco, Reading (GB); Noelia Cabello-Moreno, Reading (GB); Mahrez Amri, Reading (GB)

(73) Assignee: Johnson Matthey PLC, London (GB)

( * ) Notice: Subject to any disclaimer, the term of this patent is extended or adjusted under 35 U.S.C. 154(b) by 678 days.

(21) Appl. No.: 17/274,552

(22) PCT Filed: Sep. 13, 2019

(86) PCT No.: PCT/GB2019/052567
§ 371 (c)(1),
(2) Date: Mar. 9, 2021

(87) PCT Pub. No.: WO2020/058674
PCT Pub. Date: Mar. 26, 2020

(65) Prior Publication Data
US 2022/0059841 A1    Feb. 24, 2022

(30) Foreign Application Priority Data
Sep. 17, 2018   (GB) ...................................... 1815076

(51) Int. Cl.
*H01M 4/58*      (2010.01)
*H01M 4/04*      (2006.01)
(Continued)

(52) U.S. Cl.
CPC ....... *H01M 4/5825* (2013.01); *H01M 4/0471* (2013.01); *H01M 4/1397* (2013.01);
(Continued)

(58) Field of Classification Search
None
See application file for complete search history.

(56) References Cited

U.S. PATENT DOCUMENTS

2012/0328774 A1   12/2012   Liang et al.
2013/0029226 A1*   1/2013   Noh ...................... H01M 4/625
                                                    252/182.1
(Continued)

FOREIGN PATENT DOCUMENTS

CN    102299327 A    12/2011
CN    102376954 A     3/2012
(Continued)

OTHER PUBLICATIONS

Machine translation of CN102299327 (Year: 2011).*

*Primary Examiner* — Wyatt P McConnell
(74) *Attorney, Agent, or Firm* — BakerHostetler

(57) ABSTRACT

A lithium transition metal phosphate material comprising lithium iron phosphate doped with very precise amounts of aluminium dopant, the material having formula $Li_yFe_{1-x}Al_xPO_4$, in which $0.8 \leq y \leq 1.2$ and $0.0120 \leq x \leq 0.0180$. When x is within this range, the capacity of the material can be improved, and good or excellent distribution of aluminium in the lithium metal phosphate is observed.

16 Claims, 5 Drawing Sheets

(51) Int. Cl.
  *H01M 4/1397*  (2010.01)
  *H01M 4/36*    (2006.01)
  *H01M 4/62*    (2006.01)
  *H01M 10/0525* (2010.01)
  *H01M 4/02*    (2006.01)

(52) U.S. Cl.
  CPC ........... *H01M 4/366* (2013.01); *H01M 4/625* (2013.01); *H01M 10/0525* (2013.01); *H01M 2004/028* (2013.01)

(56) References Cited

U.S. PATENT DOCUMENTS

2013/0224595 A1   8/2013  Nuspl et al.
2018/0183089 A1*  6/2018  Xu .................... H01M 10/052

FOREIGN PATENT DOCUMENTS

| CN | 102522552 A | 6/2012 |
| CN | 103247801 A | 8/2013 |
| CN | 103329318 A | 9/2013 |
| CN | 102299327 B | 3/2014 |
| CN | 103858256 A | 6/2014 |
| CN | 108539198 A | 9/2018 |

* cited by examiner

LITHIUM METAL PHOSPHATE, ITS PREPARATION AND USE

FIELD OF THE INVENTION

The present invention relates to lithium transition metal phosphate materials, their preparation and use as a cathode material in secondary lithium ion batteries.

BACKGROUND OF THE INVENTION

Lithium metal phosphates with olivine structures have emerged as promising cathode materials in secondary lithium ion batteries. Advantages of lithium metal phosphates compared with other lithium compounds include the fact that they are relatively benign environmentally, and have excellent safety properties during battery handling and operation.

Melting processes, hydrothermal processes and solid-state processes are the most common synthesis routes for the preparation of lithium metal phosphates.

Relatively poor electrochemical performance of lithium metal phosphates has been attributed to their poor electronic conductivity, and their performance has been significantly improved by coating the particles with electronically conductive carbon.

There remains a need for lithium metal phosphates which can be made by simple, cost effective and scalable processes, employ low cost precursors, and exhibit comparable or improved electrochemical performance.

SUMMARY OF THE INVENTION

The present inventors have found that the electrochemical performance of lithium iron phosphate can be improved by adding very precise amounts of aluminium dopant. Accordingly, in a first preferred aspect, the present invention provides particulate carbon-coated lithium metal phosphate having the formula

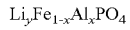

in which $0.8 \leq y \leq 1.2$ and $0.0120 \leq x \leq 0.0180$.

The present inventors have found that when x is within this range, the capacity of the material can be improved, and good or excellent distribution of aluminium in the lithium metal phosphate is observed.

It may be preferred that the carbon-coated lithium metal phosphate is prepared by a solid state process. For example, the process may involve milling such as high energy milling. Accordingly, in a second preferred aspect, the present invention provides a process for preparing particulate carbon-coated lithium metal phosphate according to the present invention, the process comprising (i) a milling step in which lithium-containing precursor, iron-containing precursor, aluminium-containing precursor and carbon-containing precursor are combined and subjected to milling; and (ii) a calcination step in which the product of the milling step is calcined to provide the particulate carbon-coated lithium metal phosphate.

The present invention further provides carbon-coated lithium metal phosphate obtained or obtainable by the process of the second aspect.

In a further preferred aspect, the present invention provides use of carbon-coated lithium metal phosphate of the present invention for the preparation of a cathode of a secondary lithium ion battery. In a further preferred aspect, the present invention provides a cathode which comprises carbon-coated lithium metal phosphate of the present invention. In a further preferred aspect, the present invention provides a secondary lithium ion battery, comprising a cathode which comprises carbon-coated lithium metal phosphate of the present invention. The battery typically further comprises an anode and an electrolyte.

DETAILED DESCRIPTION

Figure 1A:
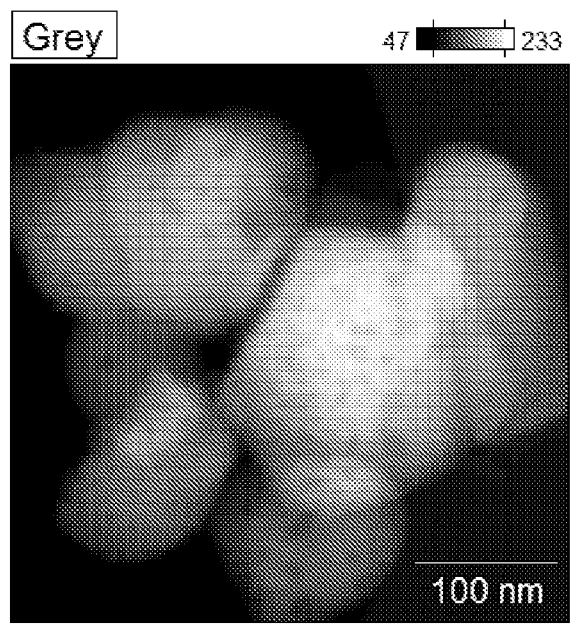
FIG. 1A shows a TEM image of the sample produced in Example 1.

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

The present invention provides particulate carbon-coated lithium metal phosphate having the formula

in which $0.8 \leq y \leq 1.2$ and $0.0120 \leq x \leq 0.0180$.

The value for y is greater than or equal to 0.8. It may be greater than or equal to 0.9, or greater than or equal to 0.95. The value for y is less than or equal to 1.2. It may be less than or equal to 1.1, or less than or equal to 1.05. The value for y may be 1, or about 1.

The value for x is greater than or equal to 0.0120. It may be greater than or equal to 0.0130, or greater than or equal to 0.0135. The value for x is less than or equal to 0.0180. It may be less than or equal to 0.0170, less than or equal to 0.0160, less than or equal to 0.0150, or less than or equal to 0.0145. The value for x may be 0.014, 0.0140, or about 0.014.

The stoichiometry of the lithium metal phosphate is typically calculated with reference to the starting materials which it is prepared from, taking into account the yield of the preparation reaction and the purity of the starting materials. In solid-state preparation processes, the yield is typically at or very close to 100%. For the calculation, it may be appropriate to assume 100% yield with respect Fe and optionally Al and/or Li.

The carbon-coated lithium metal phosphate is typically prepared by a process comprising a milling step and a calcination step. The milling step may preferably be a high energy milling step. The milling step may be a dry milling step, or may be a wet milling step, e.g. carried out in the presence of a liquid, such as water or an organic solvent. Suitable organic solvents include isopropyl alcohol, glycol ether, acetone and ethanol.

The term "high energy milling" is a term well understood by those skilled in the art, to distinguish from milling or grinding treatments where lower amounts of energy are delivered. For example, high energy milling may be understood to relate to milling treatments in which at least 100 kWh of energy is delivered during the milling treatment, per kilogram of solids being milled. For example, at least 150 kWh, or at least 200 kWh may be delivered per kilogram of solid being milled. There is no particular upper limit on the energy, but it may be less than 500 kWh, less than 400 kWh, or less than 350 kWh per kilogram of solids being milled. Energy in the range from 250 kWh/kg to 300 kWh/kg may be typical. The milling energy is typically sufficient to cause mechanochemical reaction of the solids being milled.

In the milling step lithium-containing precursor, iron-containing precursor, aluminium-containing precursor and carbon-containing precursor are combined and subjected to milling. The nature of the precursors is not limited in the present invention. If phosphorus is not provided as part of one of the iron, lithium or aluminium precursors added in the milling step, a separate phosphorous-containing precursor (e.g. phosphate-containing precursor) is typically added. In the case of a wet milling step, spray drying may be carried out between the milling and calcination steps.

Suitable lithium-containing precursors include lithium carbonate ($Li_2CO_3$), lithium hydrogen phosphate ($Li_2HPO_4$) and lithium hydroxide (LiOH). $Li_2CO_3$ may be preferred.

Suitable iron-containing precursors include iron phosphate ($FePO_4$) and iron oxalate. The iron phosphate may be hydrated (e.g. $FePO_4.2H_2O$) or may be dehydrated. $FePO_4$ may be preferred.

The iron-containing precursor may have a D50 particle size of about 4 μm, e.g. in the range from 0.5 μm to 15 μm. The D50 particle size may be at least 1 μm or at least 2 μm. It may be less than 10 μm, less than 6 μm, less than 5 μm or less than 4.5 μm. The iron phosphate may have a D10 particle size of about 1.5 μm, e.g. 0.5 μm to 3 μm. The iron phosphate may have a D90 particle size of about 8 μm, e.g. 5 μm to 10 μm, e.g. 6 μm to 9 μm.

Suitable aluminium-containing precursors include aluminium hydroxide ($Al(OH)_3$), aluminium chloride ($AlCl_3$) and aluminium oxide ($Al_2O_3$). $Al(OH)_3$ may be preferred, since the present inventors have found that material prepared using this aluminium-containing precursor may have a higher capacity, and exhibit excellent dispersion of aluminium.

Typically, the aluminium, iron, lithium (and optionally phosphorus) precursors are combined in suitable proportions to give the desired stoichiometry to the lithium metal phosphate product.

The nature of the carbon-containing precursor is not particularly limited in the present invention. Carbon precursors are typically carbon-containing compounds which decompose to a carbonaceous residue when exposed to the calcination step. For example, the carbon-containing precursor may be one or more of starch, maltodextrin, gelatine, polyol, sugar (such as mannose, fructose, sucrose, lactose, glucose, galactose), and carbon-based polymers such as polyacrylate, polyvinyl acetate (PVA) and polyvinyl butyrate (PVB). Alternatively, the carbon-containing precursor may be elemental carbon, such as one or more of graphite, carbon black, acetylene black, carbon nanotubes and carbon fibres (such as vapour grown carbon fibres, VGCF). PVB may be preferred in some embodiments.

The amount of carbon precursor added is not particularly limited in the present invention. For example, the amount of carbon precursor may be selected to give a carbon content of 1 to 5 wt % in the carbon-coated lithium metal phosphate, e.g. 2 to 3 wt %. The amount of carbon precursor added in the milling step may be in the range from 3 to 15 wt %, e.g. 3 to 7 wt %, depending on the nature of the carbon precursor, and its carbonisation yield.

The lithium metal phosphate may have a crystallite size of at least 60 nm when determined by Rietveld analysis of XRD data. The upper limit on the crystallite size is not particularly limited, but may be 500 nm or less, 200 nm or less, 100 nm or less, 80 nm or less or 70 nm or less. Larger observed crystallite sizes can indicate a higher degree of crystallinity and fewer crystalline defects, which can enhance lithium ion conduction within the lithium metal phosphate material thereby enhancing electrochemical performance.

In the calcination step, the product of the milling step is typically calcined under an inert atmosphere to provide the particulate carbon-coated lithium metal phosphate. The calcination step performs two functions. Firstly, it results in pyrolysis of the carbon precursor to form a conductive carbon coating on the lithium metal phosphate particles. Secondly, it results in crystallisation of the formation of the lithium metal phosphate into the desired olivine structure. Typically, the calcination is carried out in an inert atmosphere, for example in an inert gas such as argon. Alternatively, it may be carried out in a reducing atmosphere.

It is typically carried out at a temperature in the range from 550° C. to 800° C., e.g. from 600° C. to 750° C., or from 600° C. or 650° C. to 700° C. 680° C. is particularly suitable. Typically, the calcination is carried out for a period of 3 to 24 h. The calcination time depends on the scale of manufacture (i.e. where larger quantities are prepared, longer calcination times may be preferred). At a commercial scale, 8 to 15 hours may be suitable, for example.

The process of the present invention may further comprise the step of forming an electrode (typically a cathode) comprising the carbon-coated lithium metal phosphate. Typically, this is carried out by forming a slurry of the particulate carbon-coated lithium metal phosphate, applying the slurry to the surface of a current collector (e.g. an aluminium current collector), and optionally processing (e.g. calendaring) to increase the density of the electrode. The slurry may comprise one or more of a solvent, a binder and additional carbon material.

The process of the present invention may further comprise constructing a battery or electrochemical cell including the electrode comprising the carbon-coated lithium metal phosphate. The battery or cell typically further comprises an anode and an electrolyte. The battery or cell may typically be a secondary (rechargeable) lithium ion battery.

The present invention will now be described with reference to the following examples, which are provided to assist with understanding the present invention, and are not intended to limit its scope.

EXAMPLES

For all synthesis examples, comparative examples, and LFP reference samples the following procedure was followed. Table 1 below shows the formula of the lithium iron phosphate produced, and the type and amount of the precursors.

$Li_2CO_3$, $FePO_4$, aluminium hydroxide from Sigma Aldrich (99.9%), and PVB (as carbon source) were mixed in the desired proportions in order to get the stoichiometric composition for 50 mmol of LiFePO$_4$. The materials were put into a 250 ml ZrO$_2$ vessel, together with YSZ spheres of 3 mm. The spheres/metal oxides weight ratio was equal to 10/1. Then the solids were then milled (400 rpm) for 3 h, in a planetary mill (high energy mill). The milling was conducted in sessions of 20 min with 10 of resting in between (i.e. the samples were subjected to active milling for 120 minutes).

The samples were calcined in argon at 680° C. for 5 hours to form the olivine lithium iron phosphate coated with conductive carbon.

TABLE 1

| Example | Product | Al precursor | Al precursor (g) | Li$_2$CO$_3$ (g) | FePO$_4$ (g) | PVB (to give 4.7 wt %) |
|---|---|---|---|---|---|---|
| 1 | LiFe$_{0.986}$Al$_{0.014}$PO$_4$ | Al(OH)$_3$ | 0.107 | 3.732 | 18.425 | 1.046 |
| 2 (comp) | LiFe$_{0.990}$Al$_{0.010}$PO$_4$ | Al(OH)$_3$ | 0.078 | 3.732 | 18.495 | 1.048 |
| 3 (comp) | LiFe$_{0.973}$Al$_{0.027}$PO$_4$ | Al(OH)$_3$ | 0.215 | 3.732 | 18.168 | 1.039 |
| 4 (comp) | LiFe$_{0.945}$Al$_{0.055}$PO$_4$ | Al(OH)$_3$ | 0.429 | 3.732 | 17.654 | 1.025 |
| 5 | LiFe$_{0.986}$Al$_{0.014}$PO$_4$ | Al$_2$O$_3$ | 0.142 | 3.732 | 18.425 | 1.048 |
| 6 (comp) | LiFe$_{0.973}$Al$_{0.027}$PO$_4$ | Al$_2$O$_3$ | 0.283 | 3.732 | 18.168 | 1.043 |
| 7 (comp) | LiFe$_{0.945}$Al$_{0.055}$PO$_4$ | Al$_2$O$_3$ | 0.566 | 3.732 | 17.654 | 1.032 |
| LFP (reference) | LiFePO$_4$ | — | — | 3.732 | 18.682 | 1.053 |

* "comp" denotes a comparative example.

Table 2 below summarises the stoichiometric amounts of Fe and Al in the products of the Examples above.

TABLE 2

| Example | Fe | Al |
|---|---|---|
| 1 | 0.986 | 0.014 |
| 2 (comp) | 0.990 | 0.010 |
| 3 (comp) | 0.973 | 0.027 |
| 4 (comp) | 0.945 | 0.055 |
| 5 | 0.986 | 0.014 |
| 6 (comp) | 0.973 | 0.027 |
| 7 (comp) | 0.945 | 0.055 |

XRD Analysis

XRD of all samples indicated that olivine lithium iron phosphate is the predominant phase, with small amounts of Li$_3$PO$_4$ appearing with increasing Al content. Crystallite sizes determined by Rietveld analysis are given in the Table 3 below.

TABLE 3

| Example | Crystallite Size (nm) |
|---|---|
| 1 | 64.3 |
| 3 (comp) | 56.4 |
| 4 (comp) | 49.1 |
| 5 | 51.8 |

TABLE 3-continued

| Example | Crystallite Size (nm) |
|---|---|
| 6 (comp) | 53.2 |
| 7 (comp) | 47.2 |

Example 1, with Al$_{0.014}$ doping, prepared using Al(OH)$_3$ as the aluminium precursor has a noticeably larger crystallite size.

Table 4 shows the occupancy of aluminium ions on the lithium and iron sites in the olivine structure, as determined by Reitveld refinement.

TABLE 4

| Samples | Al Occ Li site | Al Occ Fe site | Occ Total |
|---|---|---|---|
| 1 | 0.016(2) | 0.036(2) | 0.052(4) |
| 2 (comp) | 0.000(2) | 0.018(3) | 0.018(3) |
| 3 (comp) | 0.010(2) | 0.032(3) | 0.042(5) |
| 4 (comp) | 0.027(2) | 0.051(2) | 0.078(4) |

These data show that the majority of the aluminium ions occupy iron ion sites in the lithium iron phosphate olivine structure.

Lattice volume of the unit cells of each sample as determined by XRD analysis are shown in Table 5 below, to three decimal places. Numbers in brackets represent the error in the third decimal place. Also shown is the unit cell volume of the Al-free LFP reference.

TABLE 5

| Example | V/Å$^3$ |
|---|---|
| 1 | 290.851(5) |
| 2 (comp) | 290.901(4) |
| 3 (comp) | 290.801(5) |
| 4 (comp) | 290.861(6) |

TABLE 5-continued

| Example | V/Å³ |
|---|---|
| LFP (Reference) | 290.930(3) |

The decrease in the lattice volume of the unit cell in comparison to the Al-free LFP reference supports the conclusion that the majority of aluminium ions occupy iron sites in the olivine iron phosphate structure.

TEM Analysis

Figure 1B:
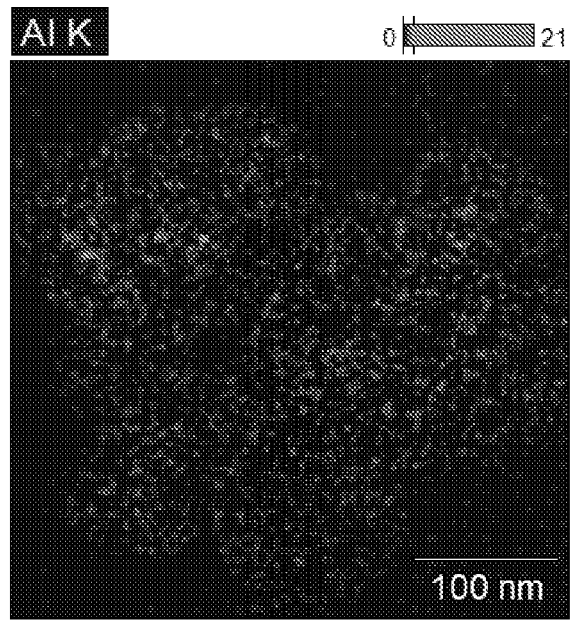
FIG. 1B shows the distribution of aluminium in the sample.

Samples from Examples 1, 4 and 5 were examined using TEM. FIG. 1A shows a TEM image of the sample produced in Example 1, and FIG. 1B shows the distribution of aluminium in the sample. The distribution of Al is excellent.

Figure 2A:
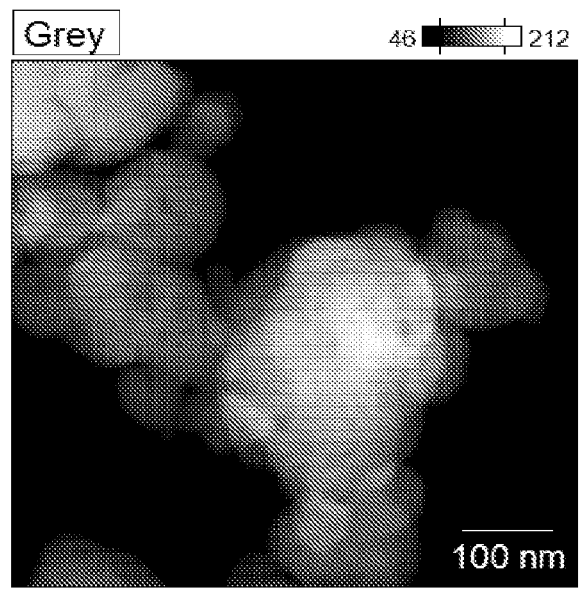
FIG. 2A shows a TEM image of the sample produced in Example 4.
Figure 2B:
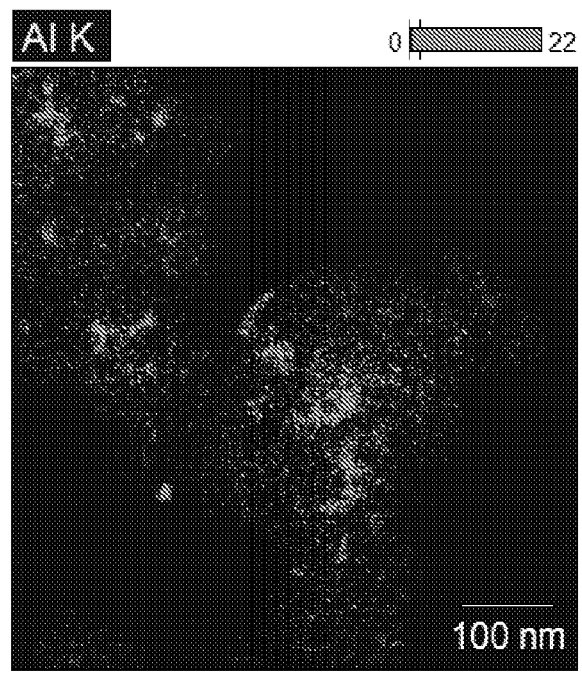
FIG. 2B shows the distribution of aluminium in the sample.

FIG. 2A shows a TEM image of the sample produced in Example 4, and FIG. 2B shows the distribution of aluminium in the sample. The distribution of Al is poor.

Figure 3A:
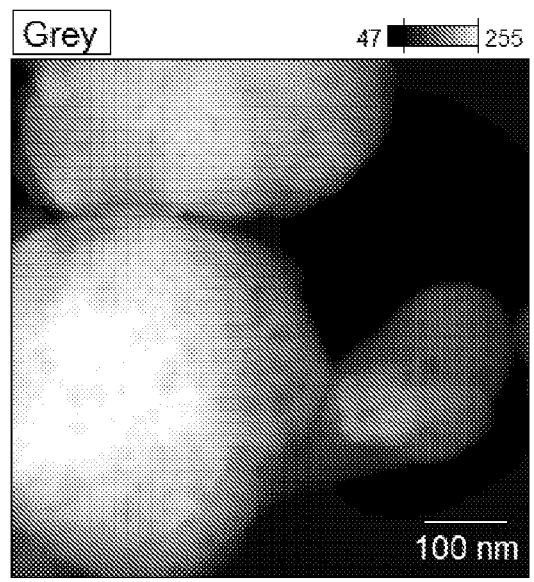
FIG. 3A shows a TEM image of the sample produced in Example 5.
Figure 3B:
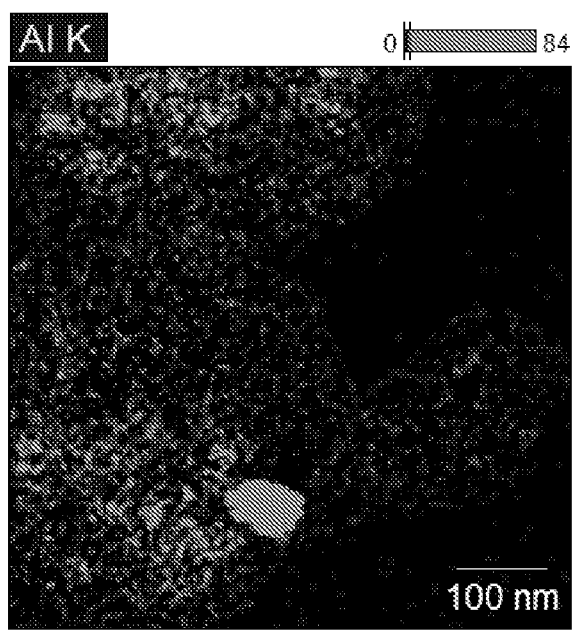
FIG. 3B shows the distribution of aluminium in the sample.

FIG. 3A shows a TEM image of the sample produced in Example 5, and FIG. 3B shows the distribution of aluminium in the sample. The distribution of Al is moderate.

Electrochemical Analysis

Electrodes were formed using the samples prepared in the Examples above. The electrode coating formulation had a solids content of approximately 40% by weight. The solids portion consisted of 90 wt % of active material from the Examples, 5 wt % carbon black (C65 from Imerys™), 5 wt % binder (Solef 5130™ (polyvinylidene fluoride, 10 wt % binder in n-methyl pyrrolidone)). The coating formulations were used to cast electrodes on a 20 μm aluminium foil using a vacuum coater, to provide an electrode loading of 5 mg/cm² (the electrode loading refers to the loading of active material on the electrode). The coated electrodes were calendared to provide a density of 2.0 g/cm³ (this is the total density of the electrode, including the active material, carbon black and the binder). The electrodes were then dried for 12 hours at 120° C.

Electrochemical coin cells (2032 button cell from Hohsen™) were formed. The electrolyte was LP30 from Solvonic™, which is 1M LiPF6 in 1:1 by weight mixture of dimethyl carbonate and ethylene carbonate. The anode was 0.75 mm thickness lithium, and the separator was a glass microfiber filter (Whatman™ GF/F). The pressure used to crimp the coin cell was 750 psi.

The electrochemical performance of the samples was measured, using a voltage window of 4.0V to 2.0V. The results of the electrochemical analysis are shown in FIGS. 4, 5, 6 and 7.

Figure 4:
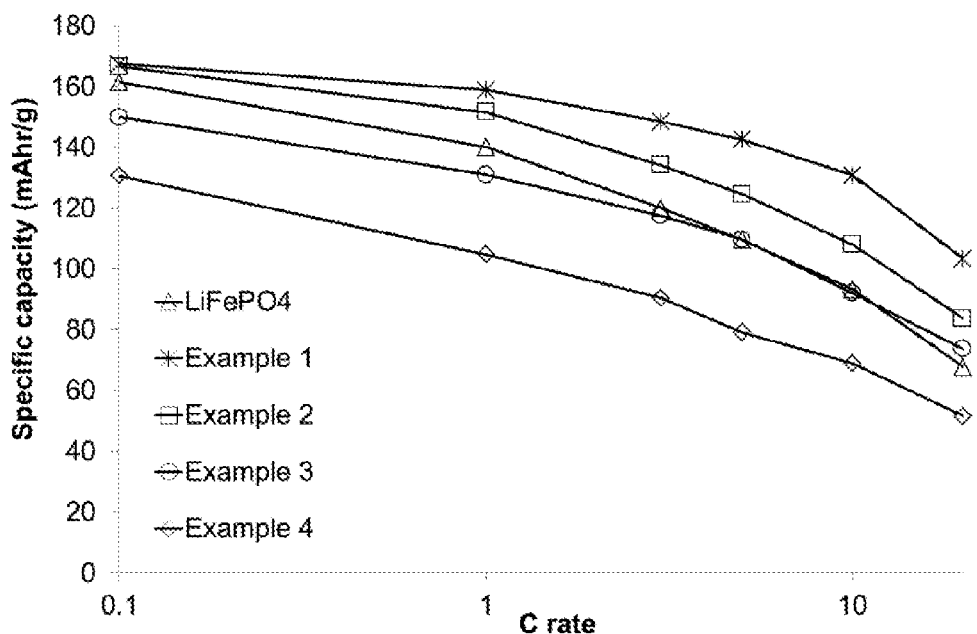
FIG. 4 shows the electrochemical performance of the samples of Examples 1, 2, 3 and 4.
Figure 5:
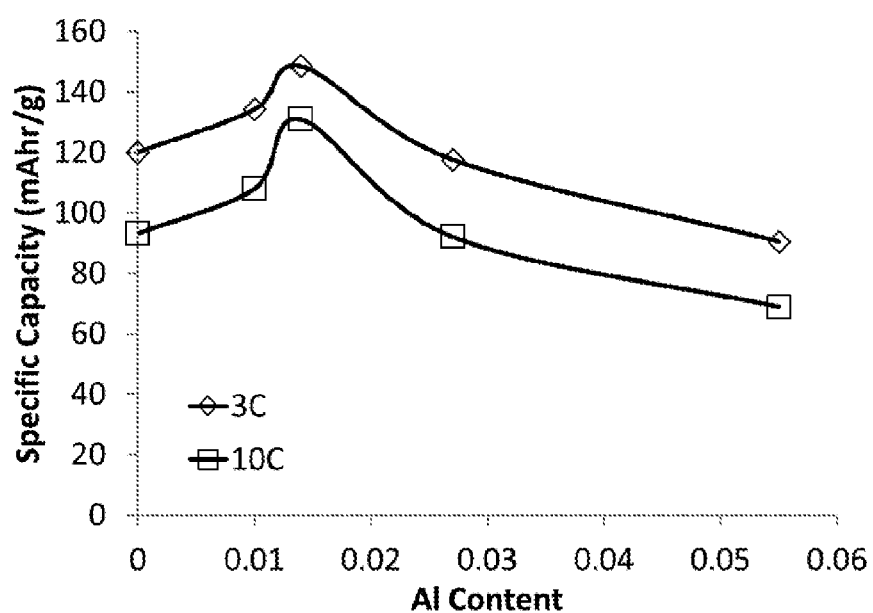
FIG. 5 shows the relationship between specific capacity and Al content at 3 C and 10 C for Examples 1, 2, 3 and 4.

FIG. 4 shows the electrochemical performance of the samples of Examples 1, 2, 3 and 4 (prepared with Al(OH)₃). Across all C-rates tested, the sample of Example 1 exhibited the highest specific capacity. FIG. 5 shows the relationship between specific capacity and Al content at 3 C and 10 C for these Examples, showing that an aluminium content of about 0.014 provides significantly higher capacities than 0.01, 0.027 and 0.055.

Figure 6:
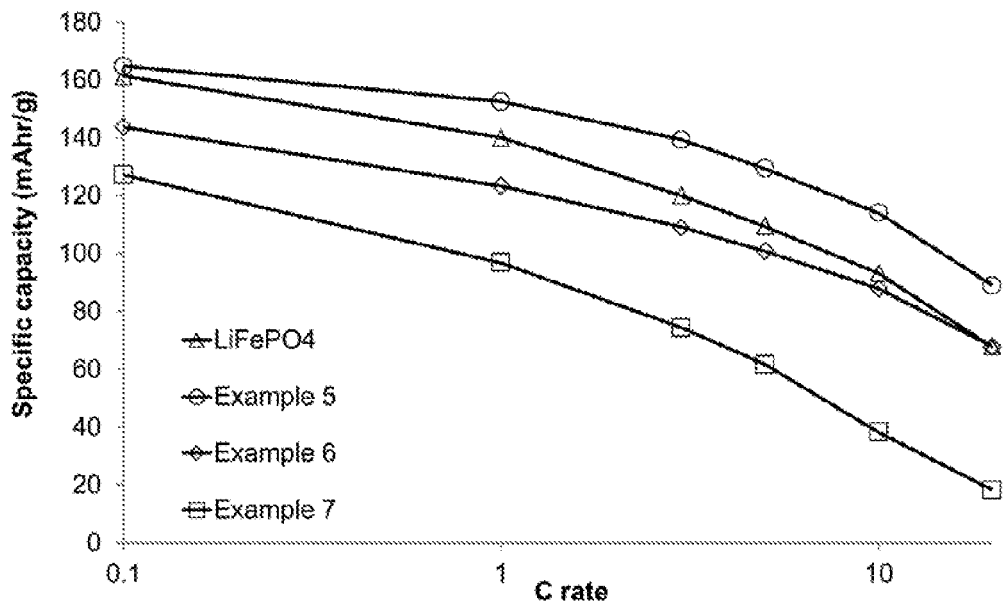
FIG. 6 shows the electrochemical performance of the samples of Examples 5, 6 and 7
Figure 7:
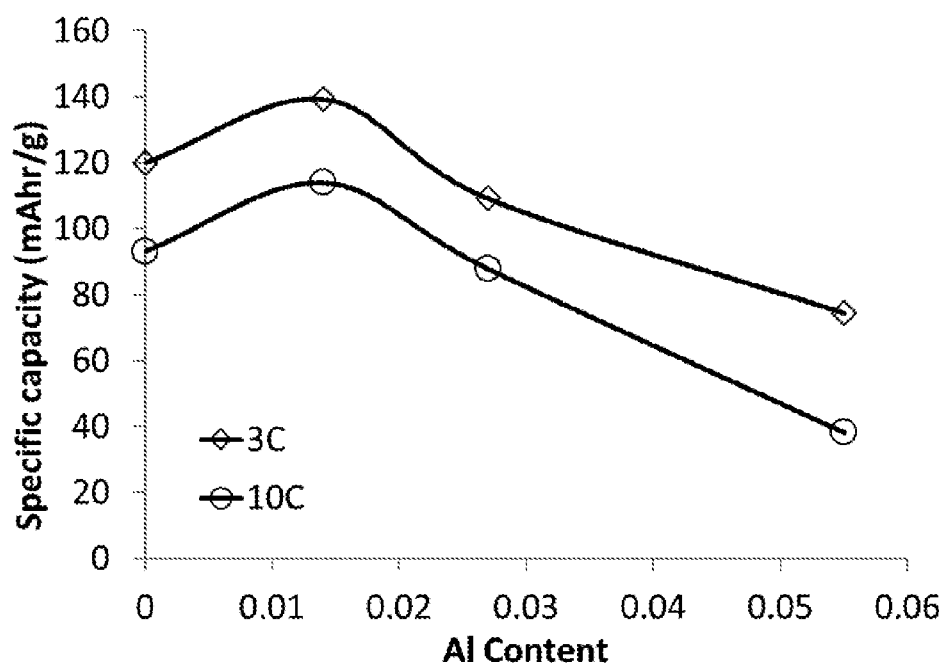
FIG. 7 shows the relationship between specific capacity and Al content at 3 C and 10 C for Examples 5, 6 and 7.

FIG. 6 shows the electrochemical performance of the samples of Examples 5, 6 and 7 (prepared with Al₂O₃). Across all C-rates tested, the sample of Example 5 exhibited the highest specific capacity. FIG. 7 shows the relationship between specific capacity and Al content at 3 C and 10 C for these Examples, showing that an aluminium content of about 0.014 provides significantly higher capacities than 0.027 and 0.055.

The invention claimed is:

1. A particulate carbon-coated lithium metal phosphate having the formula $Li_yFe_{1-x}Al_xPO_4$ in which 0.8≤y≤1.2 and 0.0120≤x≤0.0180.

2. The particulate carbon-coated lithium metal phosphate according to claim 1, in which 0.0130≤x≤0.0170.

3. The particulate carbon-coated lithium metal phosphate according to claim 1, in which 0.9≤y≤1.1.

4. The particulate carbon-coated lithium metal phosphate according to claim 1, having the formula $LiFe_{1-x}Al_xPO_4$.

5. The particulate carbon-coated lithium metal phosphate according to claim 1, wherein the lithium metal phosphate has a crystallite size determined by Rietveld analysis of 60 nm or more.

6. The particulate carbon-coated lithium metal phosphate according to claim 1 which is prepared by a solid state process.

7. A solid-state process for preparing the particulate carbon-coated lithium metal phosphate of claim 1, the process comprising
   (i) a milling step in which lithium-containing precursor, iron-containing precursor, aluminium-containing precursor and carbon-containing precursor are combined and subjected to milling; and
   (ii) a calcination step in which the product of the milling step is calcined to provide the particulate carbon-coated lithium metal phosphate.

8. The process according to claim 7 wherein at least 100 kWh of energy is delivered during the milling treatment per kilogram of solids being milled.

9. The process according to claim 7 in which the aluminium-containing precursor is AbO₃ or Al(OH)₃.

10. The process according to claim 7, further comprising forming an electrode comprising the carbon-coated lithium metal phosphate.

11. The process according to claim 10, further comprising constructing a battery including the electrode.

12. A particulate carbon-coated lithium metal phosphate obtained or obtainable by a process according to claim 7.

13. A method for preparing an electrode for a secondary lithium ion battery, comprising:
   (i) forming a slurry of the particulate carbon-coated lithium metal phosphate according to claim 1; and
   (ii) applying the slurry to the surface of a current collector.

14. An electrode for a secondary lithium ion battery comprising particulate carbon-coated lithium metal phosphate according to claim 1.

15. A secondary lithium ion battery comprising the electrode according to claim 14.

16. The process according to claim 7, wherein the aluminium-containing precursor is Al(OH)₃.

* * * * *